United States Patent
Hsu

(10) Patent No.: US 9,519,208 B2
(45) Date of Patent: Dec. 13, 2016

(54) PHOTOSENSITIVE RESIN COMPOSITION FOR COLOR FILTERS AND USES THEREOF

(71) Applicant: Chi Mei Corporation, Tainan (TW)

(72) Inventor: Jung-Pin Hsu, Tainan (TW)

(73) Assignee: Chi Mei Corporation, Tainan (TW)

( * ) Notice: Subject to any disclaimer, the term of this patent is extended or adjusted under 35 U.S.C. 154(b) by 184 days.

(21) Appl. No.: 14/173,833

(22) Filed: Feb. 6, 2014

(65) Prior Publication Data

US 2014/0246633 A1    Sep. 4, 2014

(30) Foreign Application Priority Data

Mar. 1, 2013   (TW) .............. 102107331 A

(51) Int. Cl.
| | | |
|---|---|---|
| *G02F 1/1335* | (2006.01) | |
| *G02B 5/23* | (2006.01) | |
| *G03C 1/73* | (2006.01) | |
| *G02B 5/20* | (2006.01) | |

(52) U.S. Cl.
CPC ............ *G03C 1/733* (2013.01); *G02B 5/201* (2013.01)

(58) Field of Classification Search
USPC .......................................... 252/586; 349/106
See application file for complete search history.

(56) References Cited

U.S. PATENT DOCUMENTS

2013/0018208 A1*  1/2013  Kondou ............... C09B 11/12
                                                                564/283

FOREIGN PATENT DOCUMENTS

| JP | 06-095211 | 4/1994 |
|---|---|---|
| JP | 08-183819 | 7/1996 |
| JP | 09-311210 | 12/1997 |
| JP | 2001-075273 | 3/2001 |
| JP | 2001220414 | * 8/2001 |
| TW | 201241561 | * 10/2012 |

OTHER PUBLICATIONS

"Office Action of Taiwan Counterpart Application", issued on Oct. 22, 2014, p. 1-p. 4.

* cited by examiner

*Primary Examiner* — Monique Peets
(74) *Attorney, Agent, or Firm* — Jianq Chyun IP Office

(57) ABSTRACT

A photosensitive resin composition for color filter including an alkai-soluble resin (A-1), an alkai-soluble resin (A-2) having a functional group represented by formula (2), a compound (B) having an ethylenically unsaturated group, a photoinitiator (C), an organic solvent (D), and a pigment (E) is provided, wherein the alkai-soluble resin (A-1) is formed by copolymerizing an ethylenically unsaturated monomer (a-1) having a carboxylic acid group, a compound (a-2) having a cyclicimide group represented by formula (1), and other copolymerizable ethylenically unsaturated monomers (a-3) except for the ethylenically unsaturated monomer (a-1) having the carboxylic acid group and the compound (a-2) having the cyclicimide group represented by formula (1).

formula (1)

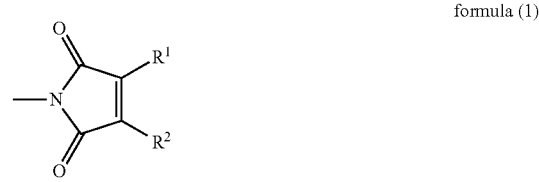

formula (2)

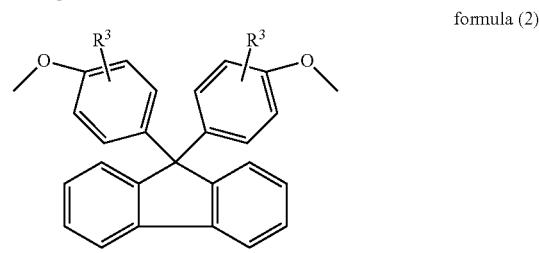

18 Claims, No Drawings

PHOTOSENSITIVE RESIN COMPOSITION FOR COLOR FILTERS AND USES THEREOF

CROSS-REFERENCE TO RELATED APPLICATION

This application claims the priority benefit of Taiwan application serial no. 102107331, filed on Mar. 1, 2013. The entirety of the above-mentioned patent application is hereby incorporated by reference herein and made a part of this specification.

BACKGROUND OF THE INVENTION

Field of the Invention

The invention relates to a photosensitive resin composition, and more particularly, to a photosensitive resin composition for color filters.

Description of Related Art

Currently, the color filter is widely used in applications such as color liquid crystal displays, color facsimile machines, and color cameras. With the ever expanding market demand for office equipment such as the color liquid display, the production of the color filter is also technically diversifying. For instance, methods such as the staining method, printing method, electrochemical plating, and dispersion method have all been developed, with the dispersion method currently being the mainstream.

In the process of the dispersion method, a pigment is first dispersed in the photosensitive resin to form a photosensitive resin composition, followed by coating the photosensitive resin composition on a glass substrate. After the steps of exposure and development etc., a specific pattern may be obtained. After repeatedly performing the processes of coating, exposure, and development three times, the desired pixel color patterns of red (R), green (G), and blue (B) may be obtained in the pixel color layer of the color filter. Then, as needed, a protective film may be applied onto the pattern of the pixel color layer.

In the dispersion fabrication process, in the example of the photosensitive resin composition used, (meth)acrylic acid is, for instance, a copolymer polymerized from monomer components, and is used as an alkali-soluble resin of the photosensitive resin composition. Relevant literatures of the photosensitive resin composition are, for instance, Japan Patent Application No. H06-95211, Japan Patent Publication No. H08-183819, and Japan Patent Publication No. H09-311210.

Moreover, in the fabrication process of the color filter, a plurality of heat treatment steps are performed, such as the step of post-bake and the step of forming an ITO film performed individually to, for instance, red (R), green (G), and blue (B) pixel color patterns after forming. The heat treatment steps generally require a temperature of over 200° C. to complete. However, when the known photosensitive resin is heated under the conditions of about 180° C. and 1 hour, problems such as the effect of pigment aggregation particles (the particle diameter of the average pigment aggregation particle is between 1 μm to 10 μm) and poor heat-resistance readily occur in the pixel color layer.

Therefore, by using the polymer of the photosensitive resin composition mentioned in JP 2001-075273, the problems above may be improved, wherein the polymer is obtained from the polymerization of an unsaturated monomer having a carboxyl group and a monomer having a glycidyl group and is used as an alkali-soluble resin for the photosensitive resin composition.

However, with the trend of increasing demand for the color saturation of the liquid crystal display, the proportion of pigments contained in the photosensitive resin composition is also increasing. However, the relative use of the alkali-soluble resin and the photosensitive monomer is decreasing, which causes the crosslinking degree to decrease after exposure. As a result, problems such as the color difference being too large after development and poor develop-resistance occur.

Therefore, satisfying heat-resistance under the premise of limited relative use of alkali-soluble resin and photosensitive monomer and solving the problem of poor develop-resistance are problems that those skilled in the art currently need to solve.

SUMMARY OF THE INVENTION

The invention provides a photosensitive resin composition for color filters and a color filter formed therefrom, wherein the photosensitive resin composition has good develop-resistance.

The invention provides a photosensitive resin composition for color filters. The photosensitive resin composition includes an alkali-soluble resin (A-1), an alkali-soluble resin (A-2) having a functional group represented by formula (2), a compound (B) having an ethylenically unsaturated group, a photoinitiator (C), an organic solvent (D), and a pigment (E), wherein the alkali-soluble resin (A-1) is formed by copolymerizing an ethylenically unsaturated monomer (a-1) having a carboxylic acid group, a compound (a-2) having a cyclicimide group represented by formula (1), and other copolymerizable ethylenically unsaturated monomers (a-3) except for the ethylenically unsaturated monomer (a-1) having a carboxylic acid group and the compound (a-2) having a cyclicimide group represented by formula (1).

formula (1)

In formula (1), $R^1$ and $R^2$ are each independently selected from the group consisting of a hydrogen atom and an alkyl group of a carbon number of 1 to 10, but $R^1$ and $R^2$ are not both a hydrogen atom; or $R^1$ and $R^2$ both form a carbocyclic ring;

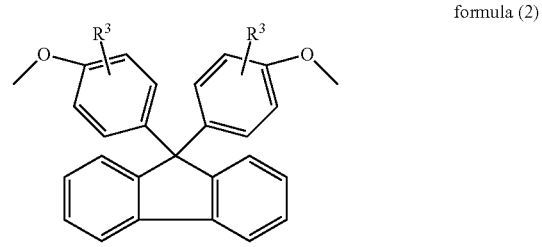

formula (2)

in formula (2), each $R^3$ is independently selected from the group consisting of a hydrogen atom, a straight chain or branch chain alkyl group of a carbon number of 1 to 5, a phenyl group, or a halogen atom.

In an embodiment of the invention, in the photosensitive resin composition for color filters, the compound (a-2) having a cyclicimide group represented by formula (1) (hereinafter, the compound (a-2) having a cyclicimide group represented by formula (1) is referred to as: cyclicimide group-containing compound (a-2)) is selected from the group consisting of the compounds represented by formula (3), formula (4), and formula (5). In particular, the compound represented by formula (3) is as follows:

formula (3)

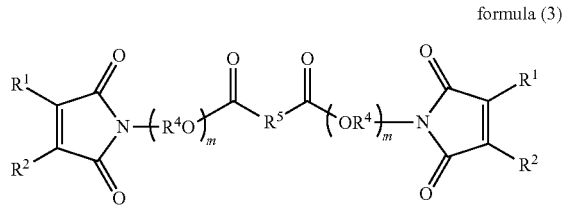

In formula (3), $R^1$ and $R^2$ are each independently selected from the group consisting of a hydrogen atom and an alkyl group of a carbon number of 1 to 10, but $R^1$ and $R^2$ are not both a hydrogen atom; or $R^1$ and $R^2$ both form a carbocyclic ring; $R^4$ represents an alkylene group of a carbon number of 1 to 6; $R^5$ represents a residue obtained by removing a carboxylic acid group or an oxy dicarbonyl group from a polycarboxylic acid compound or an anhydride thereof; and m represents an integer of 1 to 6;

In addition, the compound represented by formula (4) is as follows:

formula (4)

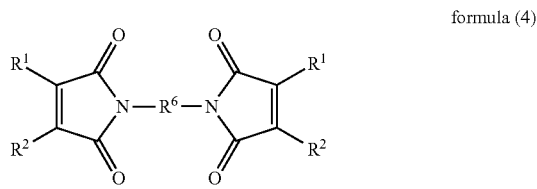

In formula (4), $R^6$ represents a residue obtained by removing an amino group from a diamine compound;

moreover, the compound represented by formula (5) is as follows:

formula (5)

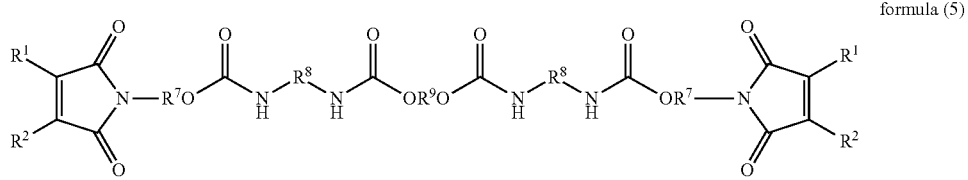

In formula (5), $R^7$ represents an alkylene group of a carbon number of 1 to 6; $R^8$ represents a residue obtained by removing an isocyanate group from a diisocyanate compound; and $R^9$ represents a residue obtained by removing a hydroxyl group from a diol compound.

In an embodiment of the invention, regarding the photosensitive resin composition for color filters, based on a total amount of 100 parts by weight of the alkali-soluble resin (A-1) and the alkali-soluble resin (A-2), the content of the alkali-soluble resin (A-1) is between 30 parts by weight and 90 parts by weight and the content of the alkali-soluble resin (A-2) is between 10 parts by weight and 70 parts by weight.

In an embodiment of the invention, regarding the photosensitive resin composition for color filters, based on a total amount of 100 parts by weight of the ethylenically unsaturated monomer (a-1) having a carboxylic acid group, the cyclicimide group-containing compound (a-2), and the other copolymerizable ethylenically unsaturated monomers (a-3), the content of the ethylenically unsaturated monomer (a-1) having a carboxylic acid group is between 10 parts by weight and 40 parts by weight; the content of the cyclicimide group-containing compound (a-2) is between 20 parts by weight and 60 parts by weight; and the content of the other copolymerizable ethylenically unsaturated monomers (a-3) is between 0 parts by weight and 70 parts by weight.

In an embodiment of the invention, regarding the photosensitive resin composition for color filters, based on a total amount of 100 parts by weight of the alkali-soluble resin (A-1) and the alkali-soluble resin (A-2), the content of the compound (B) having an ethylenically unsaturated group is between 50 parts by weight and 500 parts by weight; the content of the photoinitiator (C) is between 10 parts by weight and 100 parts by weight; the content of the organic solvent (D) is between 1,000 parts by weight and 10,000 parts by weight; and the content of the pigment (E) is between 100 parts by weight and 1,000 parts by weight.

In an embodiment of the invention, the photosensitive resin composition for color filters may further include a resin (F), wherein the resin (F) includes a thermoplastic resin, a heat-curable resin, or a photo-curable resin.

In an embodiment of the invention, regarding the photosensitive resin composition for color filters, based on a total amount of 100 parts by weight of the alkali-soluble resin (A-1) and the alkali-soluble resin (A-2), the content of the resin (F) is between 30 parts by weight and 300 parts by weight.

The invention further provides a fabrication method of color filters. The fabrication method uses the above photosensitive resin composition to form a pixel layer.

The invention also provides a color filter. The color filter is fabricated using the above fabrication method of color filters.

The invention also provides a liquid crystal display. The liquid crystal display includes the above color filter.

Based on the above, by using the photosensitive resin composition for color filters of the invention, the problem of poor develop-resistance faced by the prior art may be effectively improved.

To make the above features and advantages of the invention more comprehensible, several embodiments are described in detail as follows.

DESCRIPTION OF THE EMBODIMENTS

Preparation of Photosensitive Resin Composition for Color Filters

The invention provides a photosensitive resin composition for color filters. The photosensitive resin composition includes an alkali-soluble resin (A-1), an alkali-soluble resin (A-2) having a functional group represented by formula (2), a compound (B) having an ethylenically unsaturated group, a photoinitiator (C), an organic solvent (D), and a pigment (E), wherein the alkali-soluble resin (A-1) is formed by copolymerizing an ethylenically unsaturated monomer (a-1) having a carboxylic acid group, a cyclicimide group-containing compound (a-2), and other copolymerizable ethylenically unsaturated monomers (a-3) except for the ethylenically unsaturated monomer (a-1) having a carboxylic acid group and the cyclicimide group-containing compound (a-2).

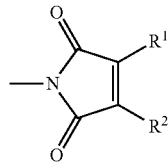

formula (1)

In formula (1), R and R are each independently selected from the group consisting of a hydrogen atom and an alkyl group of a carbon number of 1 to 10, but $R^1$ and $R^2$ are not both a hydrogen atom; or $R^1$ and $R^2$ both form a carbocyclic ring;

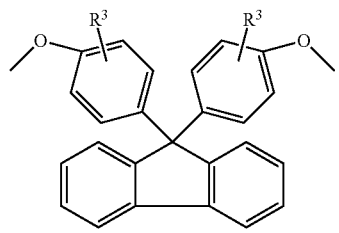

formula (2)

in formula (2), each $R^3$ is independently selected from the group consisting of a hydrogen atom, a straight chain or branch chain alkyl group of a carbon number of 1 to 5, a phenyl group, or a halogen atom.

In the following, the individual components used in the photosensitive resin composition for color filters of the invention are described in detail.

[1] Alkali-Soluble Resin (A-1)

The alkali-soluble resin (A-1) of the invention is formed by copolymerizing the ethylenically unsaturated monomer (a-1) having a carboxylic acid group, the cyclicimide group-containing compound (a-2), and the other copolymerizable ethylenically unsaturated monomers (a-3) except for the ethylenically unsaturated monomer (a-1) having a carboxylic acid group and the cyclicimide group-containing compound (a-2).

In detail, in the alkali-soluble resin (A-1), the ethylenically unsaturated monomer (a-1) having a carboxylic acid group is an ethylenically unsaturated monomer having one or more carboxylic acid groups.

Specifically, the ethylenically unsaturated monomer (a-1) having a carboxylic acid group may be exemplified as follows: an unsaturated monocarboxylic acid compound selected from acrylic acid, methacrylic acid, crotonic acid, α-chloroacrylic acid, ethyl acrylic acid, cinnamic acid, 2-acryloyloxyethyl succinate, 2-methacryloyloxyethyl succinate, and 2-isobutyloxyethyl succinate; an unsaturated dicarboxylic acid compound or an anhydride thereof, such as maleic acid, maleic anhydride, fumaric acid, itaconic acid, itaconic anhydride, citraconic acid, and citraconic anhydride; and an unsaturated polycarboxylic acid compound having three or more carboxylic acid groups or an anhydride thereof. The ethylenically unsaturated monomer (a-1) having a carboxylic acid group is preferably acrylic acid, methacrylic acid, 2-acryloyloxyethyl succinate, 2-methacryloyloxyethyl succinate, and 2-isobutyloxyethyl succinate, and more preferably 2-acryloyloxyethyl succinate, 2-methacryloyloxyethyl succinate, and 2-isobutyloxyethyl succinate.

In the alkali-soluble resin (A-1) of the invention, the ethylenically unsaturated monomer (a-1) having a carboxylic acid group is used as a raw material of copolymerization. As a result, the dispersibility of the pigment can be improved, the developing speed can be increased, and the occurrence of residue can be reduced.

In an embodiment of the invention, based on a total amount of 100 parts by weight of the ethylenically unsaturated monomer (a-1) having a carboxylic acid group, the cyclicimide group-containing compound (a-2), and the other copolymerizable ethylenically unsaturated monomers (a-3), the content of the ethylenically unsaturated monomer (a-1) having a carboxylic acid group is between 10 parts by weight and 40 parts by weight, preferably between 12 parts by weight and 38 parts by weight, and more preferably between 15 parts by weight and 35 parts by weight. When the content of the ethylenically unsaturated monomer (a-1) is between 10 parts by weight and 40 parts by weight, the photosensitive resin composition for color filters of the invention may have the advantage of fast developing speed.

The cyclicimide group-containing compound (a-2) used as the raw material of copolymerization for the alkali-soluble resin (A-1) has the cyclicimide group represented by formula (1) below.

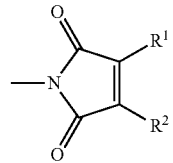

formula (1)

In formula (1), $R^1$ and $R^2$ are each independently selected from the group consisting of a hydrogen atom and an alkyl group of a carbon number of 1 to 10, but $R^1$ and $R^2$ are not both a hydrogen atom; or $R^1$ and $R^2$ both form a carbocyclic ring.

The cyclicimide group structure in the cyclicimide group-containing compound (a-2) has at least one double bond, and the carbon on one end of the double bond is bonded to an alkyl group. For instance, the carbon on each end of the double bond is each independently bonded to the alkyl groups $R^1$ and $R^2$, and $R^1$ and $R^2$ may not both be a hydrogen atom. Moreover, $R^1$ and $R^2$ preferably both form a carbocyclic ring or are each independently an alkyl group of a carbon number of 1 to 10.

In the case that $R^1$ and $R^2$ both form a carbocyclic ring, the ring of each of $R^1$ and $R^2$ is preferably a —CH$_2$CH$_2$CH$_2$- group (propylene) or a —CH$_2$CH$_2$CH$_2$CH$_2$-group(butylene). Specifically, the cyclicimide group-containing compound (a-2) preferably has the structure shown in formula (1) or formula (2).

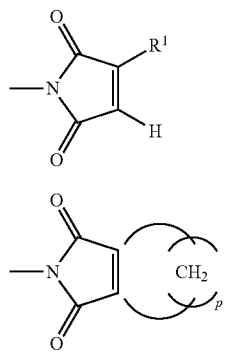

formula (1-1)

formula (1-2)

In formula (1-2), p is preferably 3 or 4.

The cyclicimide group-containing compound (a-2) may use different compounds. Specifically, the cyclicimide group-containing compound (a-2) is preferably selected from the group consisting of the compounds represented by formula (3), formula (4), and formula (5). The compounds represented by formula (3), formula (4), and formula (5) are individually described below.

In particular, the compound represented by formula (3) is as follows:

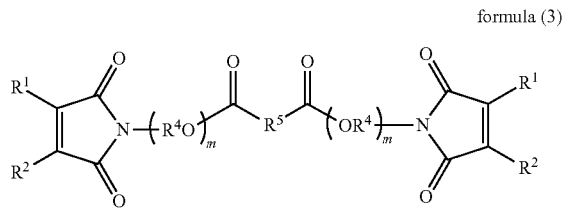

formula (3)

In formula (3), $R^1$ and $R^2$ are as described in formula (1); $R^4$ represents an alkylene group of a carbon number of 1 to 6; $R^5$ represents a residue obtained by removing a carboxylic acid group or an oxy dicarbonyl group from a polycarboxylic acid compound or an anhydride thereof; and m represents an integer of 1 to 6.

In formula (3), $R^4$ represents an alkylene group of a carbon number of 1 to 6. More specifically, $R^4$ may be a branch chain or straight chain alkylene group, and more preferably is ethylene or propylene.

In formula (3), $R^5$ represents a residue obtained by removing a carboxylic acid group or an oxy dicarbonyl group from a polycarboxylic acid compound or an anhydride thereof. Examples of the polycarboxylic acid compound or the anhydride thereof include a dicarboxylic acid compound or an anhydride thereof, and a tetracarboxylic acid compound or an anhydride thereof, wherein a preferred example of the polycarboxylic acid compound or the anhydride thereof is a dicarboxylic acid compound or an anhydride thereof.

Examples of the dicarboxylic acid compound or the anhydride thereof include an aliphatic dicarboxylic acid compound or an anhydride thereof, a cyclic aliphatic dicarboxylic acid compound or an anhydride thereof, and an aromatic dicarboxylic acid compound or an anhydride thereof.

Examples of the aliphatic dicarboxylic acid compound or the anhydride thereof include the saturated aliphatic diacids (anhydrides), such asmalonic acid (anhydride), succinic acid (anhydride), methylsuccinic acid (anhydride), glutaric acid (anhydride), 3-methylglutaric acid (anhydride), sebacic acid, and 1,10-dodecanedioic acid (anhydride); and the unsaturated aliphatic dicarboxylic acids (anhydrides) such as maleic acid (anhydride), itaconic acid (anhydride), and citraconic acid (anhydride). The aliphatic dicarboxylic acid or the anhydride thereof may also have a hydrogen atom, a nitrogen atom, or a sulfur atom. Examples of the saturated aliphatic dicarboxylic acid compound or the anhydride thereof having a hydrogen atom include diglycolic acid (anhydride) or 3-oxoadipic acid (anhydride); examples of the aliphatic dicarboxylic acid or the anhydride thereof having a nitrogen atom include iminodiacetic acid (anhydride); and examples of the aliphatic dicarboxylic acid or the anhydride thereof having a sulfur atom include 3,3'-thiodipropionic acid (anhydride).

Examples of the cyclic aliphatic dicarboxylic acid compound or the anhydride thereof include hexahydrophthalic acid (anhydride).

Examples of the aromatic dicarboxylic acid compound or the anhydride thereof include phthalic acid (anhydride), terephthalic acid (anhydride), isophthalic acid, 1,4-naphthalenedicarboxylic acid, 2,6-pyrazinedicarboxylic acid, or 2,3-naphthalenedicarboxylic acid.

Examples of the tetracarboxylic acid compound or the anhydride thereof include 3,3',4,4'-diphenyltetracarboxylic dianhydride or ethylenediaminetetraacetic dianhydride.

In formula (3), in a preferred embodiment of the invention, $R^5$ represents a residue obtained by removing a carboxylic acid group or an oxy dicarbonyl group from a polycarboxylic acid compound or an anhydride thereof. Specifically, $R^5$ is, for instance, an alkylene group of a carbon number of 4 to 20.

Moreover, in particular, the compound represented by formula (4) is as follows:

formula (4)

In formula (4), $R^1$ and $R^2$ are as described in formula (1) and $R^6$ represents a residue obtained by removing an amino group from a diamine compound.

In formula (4), $R^6$ represents a residue obtained by removing an amino group from a diamine compound. Moreover, examples of the diamine compound include an aliphatic diamine compound and an aromatic diamine compound.

Examples of the aliphatic diamine compound include ethylenediamine, 1,3-propanediamine, or 1,6-hexylenediamime. The aliphatic diamine compound may also include a hydrogen atom, a nitrogen atom, or a sulfur atom. Examples of the aliphatic diamine compound including a hydrogen atom include 4,9-dioxa-1,12-dodecanediamine; examples of the aliphatic diamine including a nitrogen atom include N-(2-aminoethyl)-1,3-propanediamine or N-(3-aminopropyl)-1,3-propanediamine; and examples of the aliphatic diamine including a sulfur atom include 2-methyl-3-thiosemicarbazide.

Examples of the aromatic diamine compound include 1,1-naphthalene-2,2-diamine, 1,2-diaminobenzene, 4,5-dimethyl-1,2-phenylenediamine, 2,3-diaminopyridine, or -2,4-diaminopyridine.

In formula (4), in a preferred embodiment of the invention, $R^6$ represents a residue obtained by removing an amino group from a diamine compound. Specifically, $R^6$ is, for instance, an alkylene group of a carbon number of 2 to 20.

Moreover, in particular, the compound represented by formula (5) is as follows:

1-242569. In simple terms, by reacting a maleic anhydride compound having a substituent or a polycarboxylic acid compound or an anhydride thereof with an amino alcohol, the cyclicimide group-containing compound (a-2) may be obtained.

In an embodiment of the invention, the synthesis method of the cyclicimide group-containing compound (a-2) having the structure shown in formula (3) is: first reacting a maleic anhydride compound with an amino alcohol in a cycloaddition reaction to obtain an alcohol compound having the cyclicimide group represented by formula (1), and then reacting the alcohol compound having the cyclicimide group represented by formula (1) with a polycarboxylic acid

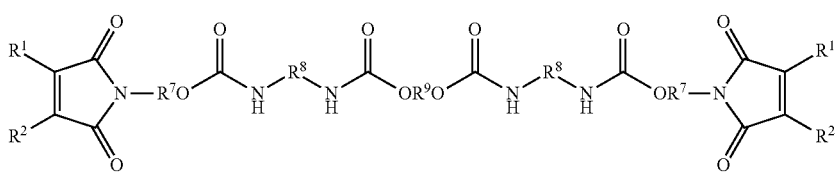

formula (5)

In formula (5), $R^1$ and $R^2$ are as described in formula (1), $R^7$ represents alkylene group of a carbon number of 1 to 6, $R^8$ represents a residue obtained by removing an isocyanate group from a diisocyanate compound; and $R^9$ represents a residue obtained by removing a hydroxyl group from a diol compound.

In formula (5), $R^7$ represents a branch chain or straight chain alkylene group of a carbon number of 1 to 6. More specifically, $R^7$ is preferably ethylene or propylene.

In formula (5), $R^8$ represents a residue obtained by removing an isocyanate group from a diisocyanate compound, wherein examples of the diisocyanate compound are preferably toluene diisocyanate, 1,6-hexane diisocyanate, 4,4'-diphenylmethane diisocyanate, polymethylene polyphenyl isocyanate, hydrogenated tolylene diisocyanate, hydrogenated 4,4'-diphenylmethane diisocyanate, xylene diisocyanate, hydrogenated xylene diisocyanate, p-phenylene diisocyanate, 1,5-naphthalene diisocyanate, 4,4'-dicyclohexylmethane diisocyanate, or isophorone diisocyanate.

In formula (5), $R^9$ represents a residue obtained by removing a hydroxyl group from a diol compound, wherein the diol compound is preferably a low molecular weight diol compound, a polyether polyol compound, or a polyester polyol compound.

Examples of the low molecular weight diol compound include ethylene glycol, propylene glycol, cyclohexanediol, or 3-methyl-1,5-pentanediol.

Examples of the polyether polyol compound include polyalkylene glycol (such as polyethylene glycol, polypropylene glycol, or polytetramethylene glycol) or the block or random glycol copolymer of polyvinylene or polypropoxy.

The polyester polyol compound is obtained from an esterification reaction between a polyether polyol compound and/or a low molecular weight diol compound and a dicarboxylic acid compound or an anhydride thereof (such as adipic acid, succinic acid, phthalic acid, tetrahydrophthalic acid, hexahydro acid, or benzenedicarboxylic acid).

The synthesis method of the cyclicimide group-containing compound (a-2) is as described in the Journal of Synthetic Organic Chemistry Association 30(10), 897, (1972); Javier de Abajos, Polymer, vol 33(5), (1992); Japan Patent Publication No. 56-53119; and Japan Patent Publication No.

compound or an anhydride thereof in an esterification reaction to obtain the cyclicimide group-containing compound (a-2) having the structure shown in formula (3).

The maleic anhydride compound used in the invention has one or more double bond, and the carbon on one end of the double bond is bonded to an alkyl group. Examples of the maleic anhydride compound include 3,4,5,6-tetrahydrophthalic anhydride and derivatives thereof, citraconic anhydride and derivatives thereof, or dialkyl maleic anhydride and derivatives thereof; in particular, 3,4,5,6-tetrahydrophthalic anhydride and derivatives thereof are preferred due to the higher yields thereof.

Examples of the polycarboxylic acid compound or the anhydride thereof are as described above, with preferred examples being an aliphatic dicarboxylic acid compound or an anhydride thereof and a cyclic aliphatic dicarboxylic acid compound or an anhydride thereof.

Examples of the amino alcohol include 2-aminoethanol, 1-amino-2-propanol, 3-amino-1-propanol, 1-aminobutanol, or 2-(2-aminoethoxy)ethanol.

In an embodiment of the invention, the synthesis method of the cyclicimide group-containing compound (a-2) having the structure shown in formula (4) is: reacting a maleic anhydride compound with a diamine compound in a cycloaddition reaction, wherein examples of the maleic anhydride compound and the diamine compound are as described above.

In an embodiment of the invention, the synthesis method of the cyclicimide group-containing compound (a-2) having the structure shown in formula (5) is: first reacting a diol compound with a diisocyanate compound to obtain a compound having 2 isocyanate groups; and then reacting the compound having 2 isocyanate groups with the alcohol compound containing a cyclicimide group obtained from the synthesis method above to obtain the cyclicimide group-containing compound (a-2) having the structure shown in formula (5), wherein examples of the diol compound and the diisocyanate compound are as described above.

In an embodiment of the invention, the cyclicimide group-containing compound (a-2) may also be synthesized using the following method: first reacting a maleic anhydride compound with an alpha-amino-carboxylic acid in a cycloaddition reaction to synthesize a carboxylic compound having a cyclicimide group, and then reacting the carboxylic compound containing a cyclicimide group with a diol compound in an esterification reaction to obtain the cyclicimide group-containing compound (a-2).

Since the maleic anhydride compound and the polycarboxylic acid compound or the anhydride thereof used to synthesize the cyclicimide group-containing compound (a-2) each have at least one double bond and a structure in which the carbon on one end of the double bond is bonded to an alkyl group, such that a diamine compound or an amino alcohol is easily reacted in a cycloaddition reaction with the maleic anhydride compound or the polycarboxylic acid compound or the anhydride thereof. As a result, a cyclicimide group-containing compound (a-2) with a very high yield may be obtained.

In an embodiment of the invention, based on a total amount of 100 parts by weight of the ethylenically unsaturated monomer (a-1) having a carboxylic acid group, the cyclicimide group-containing compound (a-2), and the other copolymerizable ethylenically unsaturated monomers (a-3), the content of the cyclicimide group-containing compound (a-2) is between 20 parts by weight and 60 parts by weight, preferably between 22 parts by weight and 58 parts by weight, and more preferably between 25 parts by weight and 55 parts by weight. When the content of the cyclicimide group-containing compound (a-2) is between 20 parts by weight and 60 parts by weight, the fabricated photosensitive resin composition for color filters may have the advantage of develop-resistance.

Examples of the other copolymerizable ethylenically unsaturated monomers (a-3) used as the raw material of copolymerization for the alkali-soluble resin (A-1) include aromatic vinyl group compounds such as styrene, α-methylstyrene, vinyltoluene, p-chlorostyrene, and methoxystyrene; meleimides such as N-phenylmaleimide, N-o-hydroxyphenyl maleimide, N-m-hydroxyphenyl maleimide, N-p-hydroxyphenyl maleimide, N-o-methylphenyl maleimide, N-m-methylphenyl maleimide, N-p-methylphenyl maleimide, N-o-methoxyphenyl maleimide, N-m-methoxyphenyl maleimide, N-p-methoxyphenyl maleimide, and N-cyclohexylmaleimide; unsaturated carboxylic acid esters such as methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, iso-butyl acrylate, iso-butyl methacrylate, sec-butyl acrylate, sec-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, allyl acrylate, allyl methacrylate, benzyl acrylate, benzyl methacrylate, phenyl acrylate, phenyl methacrylate, methoxy triethylene glycol acrylate, methoxy triethylene glycol methacrylate, lauryl methacrylate, tetradecyl methacrylate, hexadecylmethacrylate, octadecylmethacrylate, eicosylmethacrylate, docosylmethacrylate, and dicyclopentenyloxyethyl acrylate; N,N-dimethyl aminoethyl acrylate, N,N-dimethyl aminoethyl methacrylate, N,N-diethyl aminopropyl acrylate, N,N-dimethyl aminopropyl methacrylate, N,N-dibutyl aminopropyl acrylate, and N, t-butyl aminoethyl methacrylate; unsaturated carboxylic acid epoxypropyl esters such as epoxypropyl acrylate and epoxypropyl methacrylate; carboxylic acid vinyl esters such as vinyl acetate, vinyl propionate, and vinyl butyrate; unsaturated ethers such as methyl vinyl ether, ethyl vinyl ether, allyl glycidyl ether, and methallyl glycidyl ether; vinyl cyanide compounds such as acrylonitrile, methacrylonitrile, α-chloroacrylonitrile, and vinylidene cyanide; unsaturated amides such as acrylamide, methacrylamide, α-chloro acrylamide, N-hydroxyethyl acrylamide, and N-hydroxyethyl methacrylamide; and aliphatic conjugated dienes such as 1,3-butadiene, isoamylene, and chlorinated butadiene.

Examples of the other copolymerizable ethylenically unsaturated monomers (a-3) are preferably styrene, N-phenylmaleimide, methyl acrylate, methyl methacrylate, 2-hydroxyethyl acrylate, 2-hydroxyethyl methacrylate, acrylic acid benzyl ester, benzyl methacrylate, and dicyclopentenyloxyethyl acrylate. Moreover, the other copolymerizable ethylenically unsaturated monomers (a-3) may be used alone or in combination.

In an embodiment of the invention, based on a total amount of 100 parts by weight of the ethylenically unsaturated monomer (a-1) having a carboxylic acid group, the cyclicimide group-containing compound (a-2), and the other copolymerizable ethylenically unsaturated monomers (a-3), the content of the other copolymerizable ethylenically unsaturated monomers (a-3) is between 0 parts by weight and 70 parts by weight, preferably between 4 parts by weight and 66 parts by weight, and more preferably between 10 parts by weight and 60 parts by weight.

In an embodiment of the invention, based on a total amount of 100 parts by weight of the alkali-soluble resin (A-1) and the alkali-soluble resin (A-2), the content of the alkali-soluble resin (A-1) is between 30 parts by weight and 90 parts by weight. Moreover, when the alkali-soluble resin (A-1) is used in the photosensitive resin composition for color filters of the invention, the develop-resistance thereof may be increased.

[2] Alkali-Soluble Resin (A-2)

The alkali-soluble resin (A-2) has the functional group of the structure represented by formula (2).

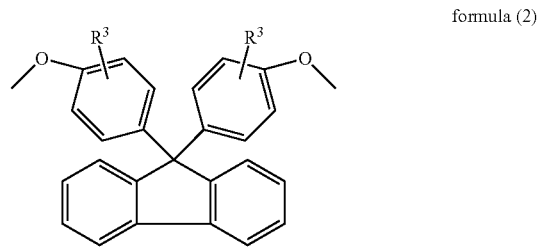

formula (2)

In formula (2), each $R^3$ is independently selected from the group consisting of a hydrogen atom, a straight chain or branch chain alkyl group of a carbon number of 1 to 5, a phenyl group, or a halogen atom.

The alkali-soluble resin (A-2) is obtained by reacting a compound having the structure of formula (2) and other copolymerizable compounds.

In an embodiment of the invention, the compound having the structure of formula (2) is the bisphenol fluorene-type compound containing an epoxy group shown in formula (2-1) or the bisphenol fluorene-type compound containing a hydroxyl group shown in formula (2-2).

formula (2-1)

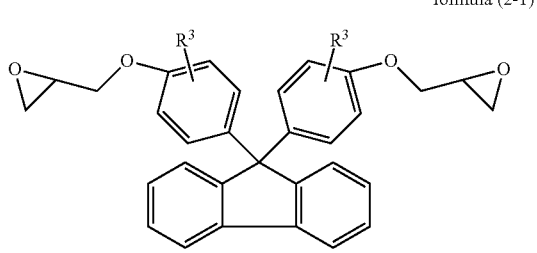

In formula (2-1), each $R^3$ is independently selected from the group consisting of a hydrogen atom, a straight chain or branch chain alkyl group of a carbon number of 1 to 5, a phenyl group, or a halogen atom.

formula (2-2)

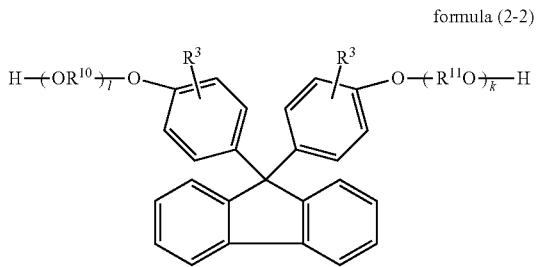

In formula (2-2), each $R^3$ is independently selected from the group consisting of a hydrogen atom, a straight chain or branch chain alkyl group of a carbon number of 1 to 5, a phenyl group, or a halogen atom; $R^{10}$ and $R^{11}$ are each independently an alkylene group or an exocyclic group of a carbon number of 1 to 20; and k and l are each independently an integer between 1 and 4.

Examples of the other copolymerizable compounds include unsaturated monocarboxylic acids such as acrylic acid, methacrylic acid, crotonic acid, α-chloroacrylic acid, ethyl acrylic acid, and cinnamic acid; dicarboxylic acids and acid anhydrides thereof such as maleic acid, itaconic acid, succinic acid, phthalic acid, tetrahydro phthalic acid, hexahydro phthalic acid, methyl tetrahydro phthalic acid, methyl hexahydro phthalic acid, methyl endo-methylene tetrahydro phthalic acid, chlorendic acid, and glutaric acid; tricarboxylic acids and acid anhydrides thereof such as 1,2,4-trimellitic acid; and tetracarboxylic acids and acid anhydrides thereof such as 1,2,4,5-pyromellitic acid, benzophenone tetracarboxylic acid, biphenyl tetracarboxylic acid, and biphenylether tetracarboxylic acid.

Preferably, the alkali-soluble resin (A-2) is such products as the V259ME and the V301ME manufactured by Nippon Steel Chemical Co. Ltd.

In an embodiment of the invention, based on a total amount of 100 parts by weight of the alkali-soluble resin (A-1) and the alkali-soluble resin (A-2), the content of the alkali-soluble resin (A-2) is between 10 parts by weight and 70 parts by weight. Moreover, when the alkali-soluble resin (A-2) is used in the photosensitive resin composition for color filters of the invention, the heat-resistance thereof may be increased.

[3] Compound (B) Having an Ethylenically Unsaturated Group

The compound (B) having an ethylenically unsaturated group may be an unsaturated compound having one ethylenically unsaturated group or an unsaturated compound having two or more ethylenically unsaturated groups.

Examples of the compound having one ethylenically unsaturated group include acrylamide, (meth)acryloylmorpholine, 7-amino-3,7-dimethyloctyl(meth)acrylate, isobutoxymethyl(meth)acrylamide, isobornyloxyethyl(meth)acrylate, isobornyl(meth)acrylate, 2-ethylhexyl(meth)acrylate, ethyl diethylene glycol(meth)acrylate, t-octyl (meth)acrylamide, diacetone(meth)acrylamide, dimethylaminoethyl(meth)acrylate, dodecyl (meth)acrylate, dicyclopentenyloxyethyl(meth)acrylate, dicyclopentenyl (meth)acrylate, N,N-dimethyl(meth)acrylamide, tetrachlorophenyl(meth)acrylate, 2-tetrachlorophenoxy ethyl(meth)acrylate, tetrahydrofurfuryl(meth)acrylate, tetrabromophenyl(meth)acrylate, 2-tetrabromophenoxyethyl(meth)acrylate, 2-trichlorophenoxyethyl(meth)acrylate, tribromophenyl(meth)acrylate, 2-tribromophenoxyethyl(meth)acrylate, 2-hydroxyethyl(meth)acrylate, 2-hydroxypropyl(meth)acrylate, vinylcaprolactam, N-vinylpyrrolidone, phenoxyethyl(meth)acrylate, pentachlorophenyl(meth)acrylate, pentabromophenyl(meth)acrylate, polyethylene glycol mono(meth)acrylate, polypropylene glycol mono(meth)acrylate or bornyl (meth)acrylate.

Examples of the unsaturated compound having two or more ethylenically unsaturated groups include ethylene glycol di(meth)acrylate, dicyclopentenyl di(meth)acrylate, triethylene glycol diacrylate, tetraethylene glycol di(meth)acrylate, tri(2-hydroxyethyl)isocyanate di(meth)acrylate, tri (2-hydroxyethyl)isocyanate tri(meth)acrylate, caprolactone-modified tri(2-hydroxyethyl)isocyanate tri(meth)acrylate, trimethylolpropyl tri(meth)acrylate, ethylene oxide (hereinafter abbreviated as EO) modified trimethylolpropyl tri (meth)acrylate, propylene oxide (hereinafter abbreviated as PO) modified trimethylolpropyl tri(meth)acrylate, tripropylene glycol di(meth)acrylate, neo-pentyl glycol di(meth)acrylate, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa (meth)acrylate (DPHA), dipentaerythritol penta(meth)acrylate, dipentaerythritol tetra(meth)acrylate, caprolactone-modified dipentaerythritol hexa(meth)acrylate, caprolactone-modified dipentaerythritol penta(meth)acrylate, ditrimethylolpropyl tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, PO-modified glycerol triacrylate, EO-modified bisphenol F di(meth)acrylate, or phenol novolac polyglycidyl ether (meth)acrylate.

The compound (B) having an ethylenically unsaturated group is preferably trimethylolpropyl triacrylate, EO-modified trimethylolpropyl triacrylate, PO-modified trimethylolpropyl triacrylate, pentaerythritol triacrylate, pentaerythritol tetraacrylate, dipentaerythritol hexaacrylate, dipentaerythritol pentaacrylate, dipentaerythritol tetraacrylate, caprolactone-modified dipentaerythritol hexaacrylate, ditrimethylolpropyl tetraacrylate, or PO-modified glycerol triacrylate. The compound (B) having an ethylenically unsaturated group may be used alone or in combination.

In an embodiment of the invention, based on a total amount of 100 parts by weight of the alkali-soluble resin (A-1) and the alkali-soluble resin (A-2), the content of the compound (B) having an ethylenically unsaturated group is between 50 parts by weight and 500 parts by weight, preferably between 75 parts by weight and 450 parts by weight, and more preferably between 100 parts by weight and 400 parts by weight.

[4] Photoinitiator (C)

The photoinitiator (C) may be an O-acyloximephotoinitiator, a triazine photoinitiator, an acetophenone compound, a biimidazole compound, or a benzophenone compound.

Specifically, examples of the O-oxime photoinitiator include
1-[4-(phenylthio)phenyl]-heptane-1,2-dione 2-(O-benzoyloxime),
1-[4-(phenylthio)phenyl]-octane-1,2-dione 2-(O-benzoyloxime),
1-[4-(benzoyl)phenyl]-octane-1,2-dione 2-(O-benzoyloxime),
1-[9-ethyl-6-(2-methylbenzoyl)-9H-carbazol-3-yl]-ethanone 1-(O-acetyloxime),
1-[9-ethyl-6-(3-methylbenzoyl)-9H-carbazol-3-yl]-ethanone 1-(O-acetyloxime),
1-[9-ethyl-6-benzoyl-9H-carbazol-3-yl]-ethanone 1-(O-acetyloxime), ethanone-1-[9-ethyl-6-(2-methyl-4-(tetrahydrofuran)benzoyl)-9H-carbazol-3-yl]-1-(O-a cetyloxime), ethanone-1-[9-ethyl-6-(2-methyl-4-(tetrahydropyranyl)benzoyl)-9H-carbazol-3-yl]-1-(O-acetyloxime),
ethanone-1-[9-ethyl-6-(2-methyl-5-(tetrahydrofuran)benzoyl)-9H-carbazol-3-yl]-1-(O-a cetyloxime), ethanone-1-[9-ethyl-6-(2-methyl-5-(tetrahydropyranyl)benzoyl)-9H-carbazol-3-yl]-1-(O-acetyloxime),
ethanone-1-[9-ethyl-6-(2-methyl-4-(tetrahydrofuran) methoxybenzoyl)-9H-carbazol-3-yl]-1-(O-acetyloxime), ethanone-1-[9-ethyl-6-(2-methyl-4-(tetrahydropyranyl) methoxybenzoyl)-9H-carbazol-3-yl]-1-(O-acetyloxime),
ethanone-1-[9-ethyl-6-(2-methyl-5-(tetrahydrofuran) methoxybenzoyl)-9H-carbazol-3-yl]-1-(O-acetyloxime), ethanone-1-[9-ethyl-6-(2-methyl-5-(tetrahydropyranyl) methoxybenzoyl)-9H-carbazol-3-yl]-1-(O-acetyloxime),
ethanone-1-[9-ethyl-6-{2-methyl-4-(2,2-dimethyl-1,3-dioxolan)benzoyl}-9H-carbazol-3-yl]-1-(O-acetyloxime), or ethanone-1-[9-ethyl-6-{2-methyl-4-(2,2-dimethyl-1,3-dioxolan)methoxybenzoyl}-9H-carbazol-3-yl]-1-(O-acetyloxime).

Examples of the triazine photoinitiator include 2,4-Bis (trichloromethyl)-6-(p-methoxy)styryl-s-triazine, 2,4-Bis (trichloromethyl)-6-(1-p-dimethylaminophenyl-1,3-butadienyl)-s-triazine, or 2-trichloromethyl-4-amino-6-(p-methoxy)styryl-s-triazine.

Examples of the acetophenone compound include p-dimethylamino-acetophenone, α,α'-dimethoxyazoxy-acetophenone, 2,2'-dimethyl-2-phenyl-acetophenone, p-methoxyacetophenone, 2-methyl-1-(4-methylthio phenyl)-2-morpholino-1-propanone, or 2-benzyl-2-N,N-dimethylamino-1-(4-morpholinophenyl)-1-butanone.

Examples of the biimidazole compound include 2,2'-bis (o-chlorophenyl)-4,4',5,5'-tetraphenyl-biimidazole, 2,2'-bis (o-fluorophenyl)-4,4',5,5'-tetraphenyl-biimidazole, 2,2'-bis (o-methyl phenyl)-4,4',5,5'-tetraphenyl-biimidazole, 2,2'-bis (o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, or 2,2'-bis(2,4-dichlorophenyl)-4,4',5,5'-tetraphenyl-biimidazole.

Examples of the benzophenone compound include thioxanthone, 2,4-diethylthioxanthone, thioxanthone-4-sulfone, benzophenone, 4 4'-bis(dimethylamino)benzophenone, or 4,4'-bis(diethylamino)benzophenone.

The photoinitiator (C) is preferably 1-[4-(phenylthio) phenyl]-octane-1,2-dione 2-(O-benzoyloxime), 1-[9-ethyl-6-(2-methylbenzoyl)-9H-carbazol-3-yl]-ethanone 1-(O-acetyloxime), ethanone-1-[9-ethyl-6-(2-methyl-4-(tetrahydrofuran)methoxybenzoyl)-9H-carbazol-3-yl]-1-(O-acetyloxime), ethanone-1-[9-ethyl-6-{2-methyl-4-(2,2-dimethyl-1,3-dioxolan) methoxybenzoyl}-9H-carbazol-3-yl]-1-(O-acetyloxime), 2,4-bis(trichloromethyl)-6-p-methoxystyryl-s-triazine, 2-benzyl-2-N,N-dimethylamino-1-(4-morpholinophenyl)-1-butanone, 2,2'-bis(2,4-dichlorophenyl)-4,4',5,5'-tetraphenyl-biimidazole, or 4,4'-bis(diethylamino)benzophenone.

In an embodiment of the invention, based on a total amount of 100 parts by weight of the alkali-soluble resin (A-1) and the alkali-soluble resin (A-2), the content of the photoinitiator (C) is between 10 parts by weight and 100 parts by weight, preferably between 15 parts by weight and 90 parts by weight, and more preferably between 20 parts by weight and 80 parts by weight.

[5] Organic Solvent (D)

The organic solvent (D) needs to be able to dissolve the alkali-soluble resin (A-1), alkali-soluble resin (A-2), compound (B) having an ethylenically unsaturated group, photoinitiator (C), and pigment (E). Moreover, the organic solvent (D) does not react mutually with the ingredients and has an appropriate volatility.

Examples of the organic solvent (D) include (poly)alkylene glycol monoalkyl ethers such as ethylene glycol monomethyl ether, ethylene glycol monoethyl ether, diethylene glycol methyl ether, diethylene glycol ethyl ether, diethylene glycol n-propyl ether, diethylene glycol n-butyl ether, triethylene glycol methyl ether, triethylene glycol ethyl ether, propylene glycol methyl ether, propylene glycol ethyl ether, dipropylene glycol methyl ether, dipropylene glycol ethyl ether, dipropylene glycol n-propyl ether, dipropylene glycol n-butyl ether, tripropylene glycol ethyl ether, and tripropylene glycol ethyl ether; (poly)alkylene glycol monoalkyl ether acetates such as ethylene glycol monomethyl ether acetate, ethylene glycol monoethyl ether acetate, propylene glycol monomethyl ether acetate, and propylene glycol monoethyl ether acetate; other ethers such as diethylene glycol dimethyl ether, diethylene glycol methyl ethyl ether, diethylene glycol diethyl ether, and tetrahydrofuran; ketones such as methyl ethyl ketone, cyclohexanone, 2-heptanone, and 3-heptanone; alkyl lactates such as methyl 2-hydroxypropanoate and ethyl 2-hydroxypropanoate; other esters such as methyl 2-hydroxy-2-methylpropanoate, ethyl 2-hydroxy-2-methylpropanoate, methyl 3-methoxypropanoate, ethyl 3-methoxypropanoate, methyl 3-ethoxypropanoate, ethyl 3-ethoxypropanoate (EEP), ethyl ethoxyacetate, ethyl hydroxyacetate, methyl 2-hydroxy-3-methylenebutyrate, 3-methyl-3-methoxybutyl acetate, 3-methyl-3-methoxybutyl propanoate, ethyl acetate, n-propyl acetate, isopropyl acetate, n-butyl acetate, isobutyl acetate, n-amyl acetate, isoamyl acetate, n-butyl propanoate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxybutyrate; aromatic hydrocarbons such as toluene and xylene; carboxylic amines such as N-methylpyrrolidone, N,N-dimethylformamide, and N,N-dimethylacetamide. The organic solvent (D) is preferably propylene glycol monomethyl ether acetate or ethyl 3-ethoxypropionate. Moreover, the organic solvent (D) may be used alone or in combination.

In an embodiment of the invention, based on a total amount of 100 parts by weight of the alkali-soluble resin (A-1) and the alkali-soluble resin (A-2), the content of the organic solvent (D) is between 1,000 parts by weight and 10,000 parts by weight, preferably between 1,500 parts by weight and 9,000 parts by weight, and more preferably between 2,000 parts by weight and 8,000 parts by weight.

[6] Pigment (E)

The pigment (E) may be an inorganic pigment, an organic pigment, or a mixture thereof. The inorganic pigment may be a metal compound such as a metal oxide compound or a metallic complex salt, and examples thereof include metal oxides such as iron, cobalt, aluminum, cadmium, lead, copper, titanium, magnesium, chromium, zinc, and antimony, and composite oxides of the metals thereof.

Examples of the organic pigment include, for instance, C. I. pigment yellow 1, 3, 11, 12, 13, 14, 15, 16, 17, 20, 24, 31, 53, 55, 60, 61, 65, 71, 73, 74, 81, 83, 93, 95, 97, 98, 99, 100, 101, 104, 106, 108, 109, 110, 113, 114, 116, 117, 119, 120, 126, 127, 128, 129, 138, 139, 150, 151, 152, 153, 154, 155, 156, 166, 167, 168, 175; C. I. pigment orange 1, 5, 13, 14, 16, 17, 24, 34, 36, 38, 40, 43, 46, 49, 51, 61, 63, 64, 71, 73; C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81:1, 83, 88, 90:1, 97, 101, 102, 104, 105, 106, 108, 112, 113, 114, 122, 123, 144, 146, 149, 150, 151, 155, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, 265; C. I. pigment violet 1, 19, 23, 29, 32, 36, 38, 39; C. I. pigment blue 1, 2, 15, 15:3, 15:4, 15:6, 16, 22, 60, 66; C. I. pigment green 7, 36, 37; C. I. pigment brown 23, 25, 28; C. I. pigment black 1, 7. The pigment (E) may be used alone or in combination.

In an embodiment of the invention, based on a total amount of 100 parts by weight of the alkali-soluble resin (A-1) and the alkali-soluble resin (A-2), the content of the pigment (E) is between 100 parts by weight and 1,000 parts by weight, preferably between 150 parts by weight and 800 parts by weight, and more preferably between 200 parts by weight and 600 parts by weight.

In the photosensitive resin composition for color filters, the average particle diameter of the pigment (E) is generally 10 nm to 200 nm, preferably 20 nm to 150 nm, and more preferably 30 nm to 130 nm.

Depending on actual demand, the pigment (E) may be used with a dispersant such as a cationic surfactant, an anionic surfactant, a nonionic surfactant, a Zwitterionic surfactant, a polysiloxane surfactant, and a fluorosurfactant.

Examples of the surfactants include polyethylene oxide alkyl ethers such as polyethylene oxide lauryl ether, polyethylene oxide stearic acyl ether, and polyethylene oxide oleyl ether; polyethylene oxide alkylphenyl ethers such as polyethylene oxide octylphenyl ether and polyethylene oxide nonylphenyl ether; polyethylene glycol diesters such as polyethylene glycol dilaurate and poly(ethylene glycol) distearate; sorbitol anhydride fatty acid esters; fatty acid-modified polyesters; tertiary amine-modified polyurethanes; KP products manufactured by Shin-Etsu Chemical Co., Ltd., SF-8427 products manufactured by Dow Corning Toray Co., Ltd., Polyflow products manufactured by Kyoeisha Chemical Co. Ltd., F-Top products manufactured by Tochem Products Co., Ltd., Megafac products manufactured by DIC Corporation, Fluorade products manufactured by Sumitomo 3M Limited, Asahi Guard products manufactured by Asahi Glass Co., Ltd., and Surflon products manufactured by Asahi Glass Co., Ltd.

[7] Resin (F)

The photosensitive resin composition for color filters may further include a resin (F).

The resin (F) includes a thermoplastic resin, a heat-curable resin, or a photo-curable resin. Moreover, the resin (F) does not include the alkali-soluble resin (A-1) and the alkali-soluble resin (A-2) having a functional group represented by formula (2).

Examples of the thermoplastic resin may include, for instance, butyral resin, styrene-maleic anhydride copolymer, chlorinated polyethylene, chlorinated polypropylene, polyvinyl chloride, vinyl chloride-vinyl acetate copolymer, polyvinyl acetate, polyurethane-based resin, polyester resin, acrylic-based resin, alkyd resin, polystyrene resin, polyamide resin, rubber-based resin, cyclized rubber-based resin, cellulose, polyethylene (HDPE, LDPE), polybutadiene, and polyimide resin.

Examples of the heat-curable resin may include, for instance, epoxy resin, benzoguanamine resin, rosin-modified maleic acid resin, rosin-modified fumaric acid resin, melamine resin, urea resin, and phenol resin.

The photo-curable resin uses the following resins: a resin obtained by reacting a polymer having a reactive substituent (such as a hydroxyl group, a carboxyl group, or an amino group) with a methacrylic compound having a reactive substituent (such as an isocyanate group, an aldehyde group, or an epoxy group) or a cinnamic acid and then introducing a photocrosslinking group such as a methacryloyl group or a styryl group. In addition, the following may also be used: a linear polymer having an anhydride such as a styrene-maleic anhydride copolymer or an a olefin-maleic anhydride copolymer that is half-esterified by a methacrylic compound having a hydroxyl group such as a hydroxyalkyl methacrylate.

The photosensitive monomer or oligomer for transparent resins produced by hardening through irradiating light may be exemplified as: monofunctional (meth)acrylates such as methyl (meth)acrylate, ethyl (meth)acrylate, 2-hydroxyethyl (meth)acrylate, 2-hydroxypropyl (meth)acrylate, cyclohexyl (meth)acrylate, β-carboxyethyl (meth)acrylate, and tricyclodecanyl (meth)acrylate;

bifunctional (meth)acrylates such as polyethylene glycol di(meth)acrylate, 1,6-hexanediol di(meth)acrylate, triethylene glycol di(meth)acrylate, and tripropylene glycol di(meth)acrylate;

polyfunctional (meth)acrylates with three or more functional groups such as trimethylolpropane tri(meth)acrylate, pentaerythritol tri(meth)acrylate, pentaerythritol tetra(meth)acrylate, dipentaerythritol hexa(meth)acrylate, and dipentaerythritol penta(meth)acrylate;

epoxy (meth)acrylates of the reactants of epoxy compounds and (meth)acrylic acid such as 1,6-hexanediol diglycidyl ether, bisphenol A diglycidyl ether, neopentyl glycol diglycidyl ether, and phenol novolac resin;

various modified (meth)acrylate compounds such as polyester, polyurethane, isocyanurate, and methylol melamine; and monomers other than (meth)acrylate such as (meth)acrylic acid, styrene, vinyl acetate, hydroxyethyl vinyl ether, ethylene glycol divinyl ether, pentaerythritol trivinyl ether, (meth)acrylamide, N-hydroxymethyl (meth)acrylamide, N-vinyl formamide, and acrylonitrile. The monomers may be used individually or in combinations of two or more, but is not limited thereto.

The photosensitive resin composition for color filters of the invention includes the resin (F). As a result, the pixel layer formed by using the photosensitive resin composition for color filters of the invention produces foreign matter less readily. Moreover, from the viewpoint of minimized size of foreign matter, photo-curable resin is preferred.

In an embodiment of the invention, based on a total amount of 100 parts by weight of the alkali-soluble resin (A-1) and the alkali-soluble resin (A-2), the content of the resin (F) is between 30 parts by weight and 300 parts by weight, preferably between 40 parts by weight and 250 parts by weight, and more preferably between 50 parts by weight and 200 parts by weight.

Methods that may be used to prepare the photosensitive resin composition for color filters may include: placing the alkali-soluble resin (A-1), alkali-soluble resin (A-2), compound (B) having an ethylenically unsaturated group, photoinitiator (C), organic solvent (D), and pigment (E) in an agitator and stir, such that the ingredients are evenly mixed into a solution state. When necessary, the resin (F) may be added. After the solution is evenly mixed, the photosensitive resin composition in solution state for color filters may be obtained.

In addition, the preparation method of the photosensitive resin composition for color filters is not particularly limited. The pigment (E) may be added directly to a mixture composed of the alkali-soluble resin (A-1), alkali-soluble resin (A-2), compound (B) having an ethylenically unsaturated group, photoinitiator (C), and organic solvent (D) to disperse in order to form the photosensitive resin composition for color filters; alternatively, a portion of the pigment (E) may first be dispersed in a mixture composed of a portion of the alkali-soluble resin (A-1), a portion of the alkali-soluble resin (A-2), and a portion of the organic solvent (D) to form a pigment dispersion liquid, and then the rest of the alkali-soluble resin (A-1), alkali-soluble resin (A-2), compound (B) having an ethylenically unsaturated group, photoinitiator (C), and organic solvent (D) may be added to prepare the photosensitive resin composition for color filters. In addition, when necessary, the resin (F) may also be added.

The dispersion steps of the pigment (E) may be performed by mixing with a mixer such as a beads mill or a roll mill.

The photosensitive resin composition for color filters in solution state may be obtained by the methods above.

<Formation Method of Color Filters>

The invention further provides a formation method of color filters. The formation method uses the photosensitive resin composition for color filters to form a pixel layer. In the following, the pixel layer is also referred to as a pixel color layer.

The invention also provides a color filter. The color filter is formed by using the formation method of color filters.

In the following, the formation method of color filters is described in detail. The method includes steps such as, in order, a step of forming a photosensitive layer using the photosensitive resin composition for color filters, a step of applying pattern exposure to the photosensitive layer to solidify the exposed area, a step of removing the unexposed area with alkali development to form a pattern, a step of resolidification to form a pixel color layer, and a step of sputtering an indium tin oxide (ITO) protective film.

—Formation of Photosensitive Layer—

By using coating methods such as rotary coating, cast coating, or roll coating, the photosensitive resin composition in solution state for color filters above is coated on a substrate.

The substrate may be a glass used in a liquid crystal display such as an alkali-free glass, soda-lime glass, hard glass (Pyrex glass), silica glass, and such glasses with a transparent conductive film attached thereto. Alternatively, the substrate may be a substrate (such as a silicon substrate) used in a photoelectric conversion device (such as a solid imaging device).

In addition, before the photosensitive resin composition for color filters is coated on the substrate, a black matrix for shielding light that may isolate the pixel color layers of, for instance, red, green, and blue needs to first be formed on the substrate.

After the coating layer is formed, most of the organic solvent of the photosensitive resin composition for color filters is removed by a reduced pressure drying method. Next, the remaining organic solvent is completely removed by a pre-bake method, such that a pre-baked coating film is formed.

The operating conditions of the reduced pressure drying and pre-bake may be different based on the type and the mix ratio of each ingredient. Generally, the reduced pressure drying is performed at a pressure of 0 Torr to 200 Torrs for 1 second to 60 seconds, and the pre-bake is performed at a temperature of 70° C. to 110° C. for 1 minute to 15 minutes.

—Exposure Step—

The pre-baked coating film is exposed with a photomask having a specific pattern. The light used in the exposure process is preferably an ultraviolet light such as a g-line, a b-line, or an i-line. In addition, the device used to provide the ultraviolet light may be a(n)(ultra-)high pressure mercury vapor lamp and a metal halide lamp.

—Developing Step—

The exposed pre-baked coating film is immersed in a developing solution at a temperature in the range of 23±2° C. and developed for about 15 seconds to 5 minutes to remove the unnecessary portion of the exposed pre-baked coating film. As a result, a semifinished product of a pixel color layer having a predetermined pattern may be formed on the substrate.

The developing solution used may be an alkaline aqueous solution composed of basic compounds such as sodium hydroxide, potassium hydroxide, sodium carbonate, sodium hydrogen carbonate, potassium carbonate, potassium hydrogen carbonate, sodium silicate, sodium methyl silicate, ammonia solution, ethylamine, diethylamine, dimethylethylanolamine, tetramethylammonium hydroxide, tetraethylammonium hydroxide, choline, pyrrole, piperidine, or 1,8-diazabicyclo-(5,4,0)-7-undecene. The concentration of the alkaline aqueous solution is generally between 0.001 mass % and 10 mass %, preferably between 0.005 mass % and 5 mass %, and more preferably between 0.01 mass % and 1 mass %.

—Resolidification Step—

The substrate is washed with water (wherein the substrate has the semifinished product of a pixel color layer having a predetermined pattern) to remove the unnecessary portion of the exposed pre-baked coating film. Then, the semifinished product of the pixel color layer having a predetermined pattern is dried with compressed air or compressed nitrogen. Lastly, post-bake is performed on the semifinished product of the pixel color layer having a predetermined pattern using a heating device such as a hot plate or an oven, wherein the heating temperature is set between 150° C. and 250° C., the heating time when the hot plate is used is 5 minutes to 60 minutes, and the heating time when the oven is used is 15 minutes to 150 minutes. As a result, the pattern of the semifinished product of the pixel color layer having a predetermined pattern is solidified, and a pixel color layer is formed.

The steps are repeated to form, in order, the pixel color layers of, for instance, red, green, and blue on the substrate.

—Sputter Step of ITO Protective Film—

In a vacuum environment with a temperature between 220° C. and 250° C., an ITO protective film is formed on the surface of the pixel color layer by sputter. When needed, the ITO protective film is etched and wired, and a liquid crystal alignment film is coated on the surface of the ITO protective film to form a color filter having a pixel layer.

<Fabrication Method of Liquid Crystal Display>

The invention also provides a liquid crystal display. The liquid crystal display is fabricated using the color filter above.

In the liquid crystal display, the color filter formed by the formation method for color filters and a substrate provided with a thin film transistor (TFT) are configured opposite to each other, and a gap (cell gap) is set up between the two. Moreover, the surrounding area of the color filter and the substrate is laminated with an adhesive and an injection hole is left. Then, liquid crystal is injected into the injection hole inside the gap separated by the substrate surface and the adhesive. Lastly, the injection hole is sealed to form a liquid crystal layer. Then, the liquid crystal display is fabricated by providing a polarizer to each of the other side of the color filter in contact with the liquid crystal layer and the other side of the substrate in contact with the liquid crystal layer.

The liquid crystal used, i.e., the liquid crystal compound or the liquid crystal composition, is not particularly limited. In other words, any liquid crystal compound or liquid crystal composition may be used.

Moreover, the liquid crystal alignment film used in the fabrication of the color filter is used to limit the alignment of the liquid crystal molecules and is not particularly limited. Both inorganic matter and organic matter are allowed, but the invention is not limited thereto.

The invention is described in detail with the following examples. However, the invention is not limited to the content disclosed by the examples.

Synthesis Examples

Synthesis Examples of Cyclicimide Group-Containing Compound (a-2)

Synthesis Example of Cyclicimide-Containing Compound (a-2-1)

In a flask provided with an agitator, a thermometer, and a condenser, 65 g of 3,4,5,6-tetrahydrophthalic anhydride, 95 g of toluene, and 0.01 g of hydroquinone (HQ) are added. The mixture is evenly dissolved at 60° C., and then 25 g of ethanolamine is added dropwise within 1 hour. Then, a dehydration reaction is performed at 120° C. to 140° C. for 3 hours. Next, 30 g of adipic acid and 5 g of concentrated sulfuric acid are added. The reaction mixture is then cooled to about 80° C. Afterward, the reaction mixture is further heated to 120° C. to 140° C. to react for 3 hours. Then, the resulting reaction mixture is transferred to a separating funnel, and water, 15% sodium hydroxide aqueous solution, and 4% ammonium sulfate solution are used to wash the reaction mixture. Toluene is removed from the washed reaction mixture using reduced pressure distillation to obtain 80 g of light yellow liquid. The light yellow liquid is as the compound shown in formula (6).

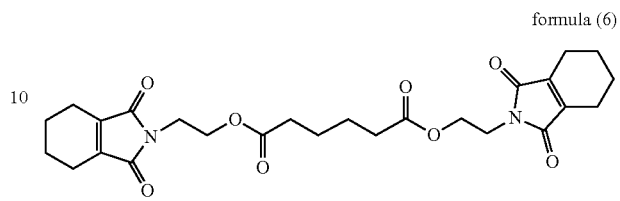

formula (6)

Synthesis Example of Cyclicimide-Containing Compound (a-2-2)

In addition to independently substituting 65 g of 3,4,5,6-tetrahydrophthalic anhydride with 80 g of citraconic anhydride, substituting 95 g of toluene with 120 g of toluene, substituting 0.01 g of benzenediol with 0.06 g of benzenediol, substituting 25 g of ethanolamine with 40 g of ethanolamine, substituting 30 g of adipic acid with 50 g of adipic acid, and substituting 5 g of concentrated sulfuric acid with 10 g of concentrated sulfuric acid, the same method as in the synthesis example of the cyclicimide-containing compound (a-2-1) is used to prepare the cyclicimide-containing compound (a-2-2). The product obtained using the method is 65 g of white solid that is as the compound shown in formula (7) below.

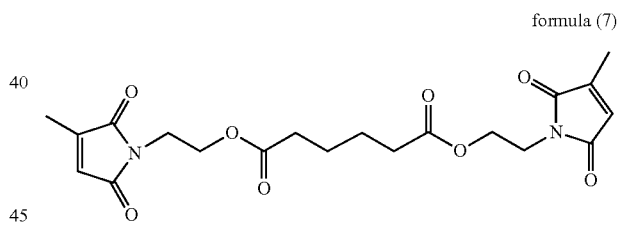

formula (7)

Synthesis Example of Cyclicimide-Containing Compound (a-2-3)

In a flask provided with an agitator, a thermometer, and a condenser, 60 g of 3,4,5,6-tetrahydrophthalic anhydride, 90 g of toluene, and 0.04 g of hydroquinone (HQ) are added. The mixture is evenly dissolved at 60° C., and then 40 g of 4,9-dioxa-1,12-dodecanediamine is added dropwise within 1 hour. Then, a dehydration reaction is performed at 120° C. to 140° C. for 3 hours. Next, 30 g of adipic acid and 5 g of concentrated sulfuric acid are added. The reaction mixture is then cooled to about 80° C. Afterward, the reaction mixture is further heated to 120° C. to 140° C. to react for 3.5 hours. Next, the reaction mixture is washed with water, the organic layer thereof is separated, and toluene is removed therefrom by reduced pressure distillation to obtain 90 g of light brown liquid. The light brown liquid is as the compound shown in formula (8).

formula (8)

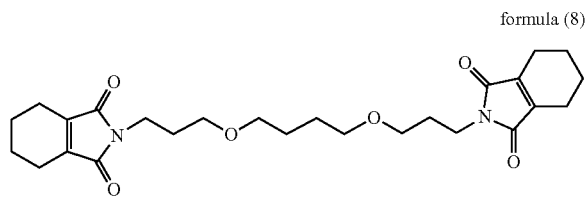 [SMILES: O=C1C2=C(CCCC2)C(=O)N1CCCOCCCCOCCCN1C(=O)C2=C(CCCC2)C1=O]

Synthesis Example of Cyclicimide-Containing Compound (a-2-4)

In a flask provided with an agitator, a thermometer, and a condenser, 30 g of 3,4,5,6-tetrahydrophthalic anhydride, 100 g of toluene, and 0.01 g of hydroquinone (HQ) are added. The mixture is evenly dissolved at 60° C., and then 12 g of ethanolamine is added dropwise within 1 hour. Then, a dehydration reaction is performed at 120° C. to 140° C. for 3 hours. After cooling to room temperature, 0.1 g of dibutyltin dilaurate and 45 g of isophorone diisocyanate are added, and then the solution is stirred at 40° C. for 30 minutes. Tripropylene glycol is then added in the amount of 20 g. After stirring at 60° C. for 2 hours, a reaction mixture is obtained. After toluene is removed from the reaction mixture using reduced pressure distillation, a viscous liquid is obtained. The viscous liquid is as the compound shown in formula (9).

Then, the compositions in the four-neck round bottom flask are stirred and the feed compositions are heated to a temperature of 100° C. by an oil bath. Next, 6 parts by weight of the polymerization initiator 2,2'-azobis-2-methyl butyronitrile (hereinafter referred to as AMBN) is added (pre-dissolved in the organic solvent EEP) in the amount of 5 equal parts in one-hour intervals in the four-neck round bottom flask to obtain a reaction mixture.

The temperature of the reaction mixture is maintained at 100° C. to perform a polymerization reaction with a reaction time of 6 hours. After the polymerization reaction is complete, the product of the polymerization reaction is removed from the four-neck round bottom flask and the organic solvent is devolatilized. As a result, the alkali-soluble resin (A-1-1) may be obtained.

Synthesis Examples of Alkali-Soluble Resin (A-1-2) to Alkali-Soluble Resin (A-1-8)

alkali-soluble resin (A-1-2) to alkali-soluble resin (A-1-8) are prepared using the same method as in the synthesis example of the alkali-soluble resin (A-1-1). The difference is the change in the type and the amount of the copolymerizable monomer and the amount of the initiator for polymerization. The formulae of the compositions above are as shown in Table 1, wherein the compounds corresponding to the labels of Table 1 are as follows.

formula (9)

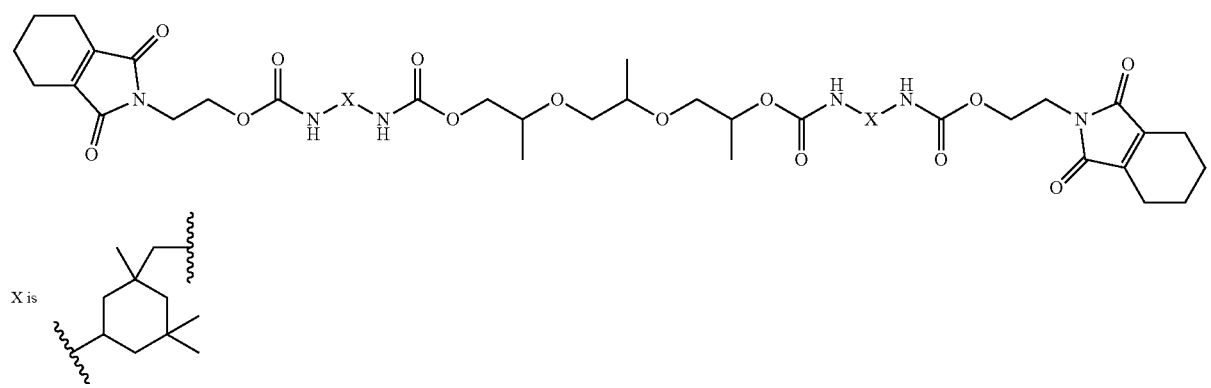

Synthesis Examples of Alkali-Soluble Resin (A-1)

Synthesis Example of Alkali-Soluble Resin (A-1-1)

A nitrogen inlet tube, an agitator, a heater, a condenser tube, and a thermometer are set up in a four-neck round bottom flask having a volume of 1,000 ml. Nitrogen is introduced and compositions are added according to the amounts shown in Table 1. The compositions include: 10 parts by weight of 2-methacryloyloxyethyl succinate monomer (hereinafter referred to as HOMS), 20 parts by weight of the cyclicimide-containing compound (a-2-1), 70 parts by weight of styrene monomer (hereinafter referred to as SM), and 200 parts by weight of the organic solvent ethyl 3-ethoxypropionate (hereinafter referred to as EEP). In particular, the feeding method of the compositions is continuous addition.

HOMS 2-methacryloyloxyethyl succinate monomer

MAA methacrylic acid

AA acrylic acid (a-2-1) compound represented by formula (6)

(a-2-2) compound represented by formula (7)

(a-2-3) compound represented by formula (8)

(a-2-4) compound represented by formula (9)

SM styrene monomer

BzMA benzyl methacrylate

FA-512A dicyclopentenyloxyethyl acrylate

MMA methyl methacrylate monomer

MA methyl acrylate monomer

AMBN 2,2'-azobis-2-methyl butyronitrile

EEP ethyl 3-ethoxypropionate

TABLE 1

Synthesis examples of alkai-soluble resin (A-1)

| Synthesis example | Composition (parts by weight) | | | | | | | | | | | | Initiator for polymerization | Solvent |
|---|---|---|---|---|---|---|---|---|---|---|---|---|---|---|
| | Copolymerizable monomer | | | | | | | | | | | | | |
| | (a-1) | | | (a-2) | | | | (a-3) | | | | | | |
| | HOMS | MAA | AA | (a-2-1) | (a-2-2) | (a-2-3) | (a-2-4) | SM | BzMA | FA-512A | MMA | MA | AMBN | EEP |
| (A-1-1) | 10 | | | 20 | | | | 70 | | | | | 6 | 200 |
| (A-1-2) | | 20 | | | 60 | | | | 10 | | 10 | | 6 | 200 |
| (A-1-3) | | | 40 | | | 20 | | | | 40 | | | 6 | 200 |
| (A-1-4) | | 40 | | | | | 60 | | | | | | 6 | 200 |
| (A-1-5) | 25 | | | 40 | | | | | | | | 35 | 6 | 200 |
| (A-1-6) | | 10 | 15 | | 20 | 20 | | 15 | 20 | | | | 6 | 200 |
| (A-1-7) | 30 | | | | | | | | | 70 | | | 5.5 | 200 |
| (A-1-8) | 10 | 20 | | | | | | | | | 30 | 40 | 5 | 200 |

Synthesis Examples of Resin (F)

Synthesis Example of Resin (F-1)

In a reaction vessel of a four-neck round bottom flask provided with a thermometer, a condenser tube, a nitrogen inlet tube, and an agitator device, 70.0 parts by weight of cycloheanone is added, and then the temperature is raised to 80° C. After the gas in the reaction vessel is replaced with nitrogen, the following mixtures are added dropwise with a pipette within two hours: 13.3 parts by weight of n-butyl methacrylate, 4.6 parts by weight of 2-hydroxyethyl methacrylate, 4.3 parts by weight of methyl methacrylate, 7.4 parts by weight of p-cumylphenol ethyleneoxide-modified acrylate (Aronix M110, manufactured by Toagosei Co., Ltd.), and 0.4 parts by weight of 2,2'-azobisisobutyronitrile. After the dropwise addition of the mixtures, the reaction was continued for three hours, and an acrylic resin solution having a weight-average molecular weight of 24,000 may be obtained. Next, after the solution is cooled to room temperature, thermal drying is applied to a sample of 2 grams of acrylic resin solution at 180° C. for 20 minutes to determine the non-volatile matter thereof, such that methoxypropyl acetate is added in a manner of 20 weight % of the non-volatile matter in the prepared acrylic resin solution in order to prepare the acrylic resin solution.

Synthesis Example of Resin (F-2)

In a reaction vessel of a four-neck round bottom flask provided with a thermometer, a condenser tube, a nitrogen inlet tube, and an agitator, 70.0 parts by weight of cycloheanone is added, and then the temperature is raised to 80° C. After the gas in the reaction vessel is replaced with nitrogen, the following mixtures are added dropwise with a pipette within two hours: 13.3 parts by weight of n-butyl methacrylate, 4.6 parts by weight of 2-hydroxyethyl methacrylate, 4.3 parts by weight of methacrylic acid, 7.4 parts by weight of p-cumylphenol ethyleneoxide-modified acrylate (Aronix M110, manufactured by Toagosei Co., Ltd.), and 0.4 parts by weight of 2,2'-azobisisobutyronitrile. After the dropwise addition of the mixtures, the reaction was continued for three hours, and an acrylic resin solution having a weight-average molecular weight of 26,000 may be obtained. Next, after the solution is cooled to room temperature, thermal drying is applied to a sample of 2 grams of acrylic resin solution at 180° C. for 20 minutes to determine the non-volatile matter thereof, such that methoxypropyl acetate is added in a manner of 20 weight % of the non-volatile matter in the prepared acrylic resin solution in order to prepare the acrylic resin solution.

EXAMPLES

Example 1

The following ingredients obtained from the synthesis examples are added to 1,000 parts by weight of propylene glycol monomethyl ether acetate (hereinafter referred to as D-1) used as an organic solvent: 40 parts by weight of the alkali-soluble resin (A-1-1), 60 parts by weight of the alkali-soluble resin (A-2-1) (Trade name: V259ME, manufactured by Nippon Steel Chemical Co. Ltd.), 50 parts by weight of trimethylolpropane triacrylate (hereinafter referred to as B-1) shown in Table 2, 5 parts by weight of 2-methyl-1-(4-methylthiophenyl)-2-morpholino-1-acetone (hereinafter referred to as C-1), 10 parts by weight of 2,2'-bis(2,4-dichlorophenyl)-4,4',5,5'-tetraphenylbiimidazole (hereinafter referred to as C-2), and 100 parts by weight of pigment C.I. Pigment R254/C.I. Pigment Y139=80/20 (hereinafter referred to as E-1). Then, the mixture is dissolved and mixed in a shaking agitator to prepare the photosensitive resin composition for color filters. The photosensitive resin composition for color filters is evaluated using the various evaluation methods below, and the results obtained are as shown in Table 2.

Examples 2 to 10 and Comparative Examples 1 to 6

The same method as example 1 is used to prepare the photosensitive resin composition for color filters of each of example 2 to example 10 and comparative example 1 to comparative example 6. The difference is the change in the type and the amount of the compositions in the photosensitive resin compositions for color filters. The components of the compositions thereof are as shown in Table 3, wherein the compounds corresponding to the labels of Table 3 are as follows.

(A-2-1) V259ME (manufactured by Nippon Steel Chemical Co. Ltd)
(A-2-2) V301ME (manufactured by Nippon Steel Chemical Co. Ltd)
(B-1) Trimethylolpropane triacrylate
(B-2) EO-modified trimethylolpropane triacrylate
(B-3) Dipentaerythritol hexaacrylate
(C-1) 2-methyl-1-(4-methylthiophenyl)-2-morpholino-1-acetone
(C-2) 2,2'-bis(2,4-dichlorophenyl)-4,4',5,5'-tetraphenylbi-imidazole
(C-3) 4,4'-bis(diethylamino)benzophenone
(C-4) 1-[4-(phenylthio)phenyl]octane-1,2-dione 2-(O-benzoyl-oxime)
(D-1) Propylene glycol methyl ether acetate
(D-2) Ethyl 3-ethoxypropionate
(E-1) C.I. Pigment R254/C.I. Pigment Y139=80/20
(E-2) C.I. Pigment G36/C.I. Pigment Y150=60/40
(E-3) C.I. Pigment B15:6
(E-4) C.I. Pigment BK7
(F-1) Synthesis example (F-1)
(F-2) Synthesis example (F-2)

[Evaluation Methods]

(a) Develop-Resistance

The photosensitive resin composition for color filters is coated on a glass substrate having a size of 100 mm×100 mm using spin coating. The glass substrate with the photosensitive resin composition is first dried under reduced pressure at a pressure of 100 mmHg for about 30 seconds. Then, the glass substrate with the photosensitive resin composition is pre-baked at 80° C. for 2 minutes to form the pre-baked coating film having a film thickness of 2.5 μm. Then, the chromaticities (L*, a*, b*) thereof are measured using a colorimeter (manufactured by Otsuka Electronics Co., Ltd., Model MCPD).

Next, after the pre-baked coating film is irradiated by an ultraviolet light (exposure machine Canon PLA-501F) of 100 mJ/cm², the pre-baked coating film is immersed in a developing solution at 23° C. for 1 minute, and then washed with pure water. Then, the chromaticity thereof is determined again and the color change (ΔEab*) is calculated using formula (10) below. The smaller the color change (ΔEab*), the better the develop-resistance. Evaluation is carried out according to the criteria below.

$$\Delta Eab^* = [(\Delta L)^2 + (\Delta a)^2 + (\Delta b)^2]^{1/2} \quad \text{formula (10)}$$

○: ΔEab*<3
Δ: 3≤ΔEab*<6
x: 6≤ΔEab*

(b) Heat-Resistance

After the coating film from evaluation method (a) having a film thickness of 2.5 m is irradiated by an ultraviolet light (exposure machine Canon PLA-501F) of 100 mJ/cm², the coating film is immersed in a developing solution at 23° C. for 1 minute. After washing with pure water, the coating film is baked at 235° C. for 30 minutes, and then a pixel color layer having a film thickness of 2.0 m may be formed on the glass substrate. Then, the chromaticities (L*, a*, b*) thereof are measured using a colorimeter (manufactured by Otsuka Electronics Co., Ltd., Model MCPD), and then the pixel color layer is left in 250° C. for 60 minutes. Then, the chromaticity thereof is determined again and the color change (ΔEab*) is calculated using formula (10). The smaller the color change (ΔEab*), the better the heat-resistance. Evaluation is carried out according to the criteria below.

○: ΔEab*<3
Δ: 3≤ΔEab*<6
x: 6≤ΔEab*

(c) Foreign Matter

Foreign matter of the pixel color layer from evaluation method (b) is observed using an optical microscope, wherein the pixel color layer has a thickness of 2.0 m and smaller size of the foreign matter is preferred. The foreign matter is evaluated according to the criteria below.

⊚: size of foreign matter<3 m
○: 3 μm≤ size of foreign matter<5 μm
Δ: 5 μm<size of foreign matter

[Evaluation Results]

As shown in Table 3, in comparison to comparative example 1, comparative example 2, and comparative example 5 that do not contain the alkali-soluble resin (A-2), comparative example 3, comparative example 4, and comparative example 6 all contain the alkali-soluble resin (A-2) and have better heat-resistance. The results show that by using the alkali-soluble resin (A-2) as the raw material in the photosensitive resin composition for color filters, the heat-resistance thereof may be increased.

As shown in Table 3, in comparative example 1 to comparative example 4 and comparative example 5, the alkali-soluble resin (A-1) is used as the raw material of the photosensitive resin composition for color filters of each example. In comparison to comparative example 1 to comparative example 4 that do not contain the cyclicimide group-containing compound (a-2) in the alkali-soluble resin (A-1) as the raw material of copolymerization, in comparative example 5, the cyclicimide group-containing compound (a-2) is used as the raw material of copolymerization in the alkali-soluble resin (A-1). As a result, the develop-resistance of the pixel color layer of comparative example 5 is better. The results show that by using the cyclicimide group-containing compound (a-2) as the raw material of copolymerization in the alkali-soluble resin (A-1) of the photosensitive resin composition for color filters, the develop-resistance of the pixel color layer may be increased.

Based on the results, referring to Table 2, in example 1 to example 10, the cyclicimide group-containing compound (a-2) is used as the raw material of copolymerization in the alkali-soluble resin (A-1) of each of the photosensitive resin compositions for color filters. Moreover, the alkali-soluble resin (A-2) is also included in each of the photosensitive resin compositions for color filters, and therefore the heat-resistance and develop-resistance are both good.

As shown in Table 2, in comparison to other examples that do not include the resin (F), in example 4, example 6, and example 7, the resin (F) is included in each of the photosensitive resin compositions for color filters, and the size of the foreign matter is smaller and better in each. The results show that adding the resin (F) to the photosensitive resin composition for color filters may help to decrease the size of foreign matter observed in the pixel color layer.

TABLE 2

Examples of photosensitive resin composition for color filters

| Ingredient | | | Example 1 | 2 | 3 | 4 | 5 | 6 | 7 | 8 | 9 | 10 |
|---|---|---|---|---|---|---|---|---|---|---|---|---|
| alkai-soluble resin (A) (parts by weight) | (A-1) | (A-1-1) | 40 | | | | | | 30 | | | |
| | | (A-1-2) | | 50 | | | | | | 90 | | |
| | | (A-1-3) | | | 55 | | | | | | 20 | |
| | | (A-1-4) | | | | 60 | | | | | | 95 |
| | | (A-1-5) | | | | | 70 | | | | | |
| | | (A-1-6) | | | | | | 80 | | | | |
| | | (A-1-7) | | | | | | | | | | |
| | | (A-1-8) | | | | | | | | | | |
| | (A-2) | (A-2-1) | 60 | | 45 | | 30 | | 40 | 10 | 80 | 5 |
| | | (A-2-2) | | 50 | | 40 | | 20 | 30 | | | |
| compound (B) having an ethylenically unsaturated group (parts by weight) | | (B-1) | 50 | | | 300 | | | 200 | | | 300 |
| | | (B-2) | | 150 | | 200 | 200 | | | 400 | | |
| | | (B-3) | | | 300 | | | 300 | | | 250 | |
| photoinitiator (C) (parts by weight) | | (C-1) | 5 | 10 | | 20 | 20 | | 30 | 20 | 30 | 30 |
| | | (C-2) | 10 | 20 | 30 | 30 | 30 | 5 | 30 | | 20 | |
| | | (C-3) | | | | | | 25 | | 30 | | 20 |
| | | (C-4) | | | 20 | 30 | | 50 | | 10 | | |
| organic solvent (D) (parts by weight) | | (D-1) | 1000 | 3000 | | 10000 | | 8000 | 3000 | 5000 | 3000 | |
| | | (D-2) | | | 5000 | | 3000 | | 3000 | | | 3000 |
| pigment (E) (parts by weight) | | (E-1) | 100 | | | | 200 | | | | 300 | |
| | | (E-2) | | 300 | | | | 700 | | | | 500 |
| | | (E-3) | | | 500 | | | | 600 | | | |
| | | (E-4) | | | | 1000 | | | | 500 | | |
| resin (F) (parts by weight) | | (F-1) | | | | | | | 150 | 50 | | |
| | | (F-2) | | | | 300 | | | | | | |
| Evaluation results | | develop-resistance | ○ | ○ | ○ | ○ | ○ | ○ | ○ | ○ | △ | ○ |
| | | heat-resistance | ○ | ○ | ○ | ○ | ○ | ○ | ○ | ○ | ○ | △ |
| | | foreign matter | ○ | ○ | ○ | ◎ | ○ | ◎ | ◎ | ○ | ○ | ○ |

TABLE 3

Comparative examples of photosensitive resin composition for color filters

| Component | | | Comparative example 1 | 2 | 3 | 4 | 5 | 6 |
|---|---|---|---|---|---|---|---|---|
| alkai-soluble resin (A) (parts by weight) | (A-1) | (A-1-1) | | | | | 100 | |
| | | (A-1-2) | | | | | | |
| | | (A-1-3) | | | | | | |
| | | (A-1-4) | | | | | | |
| | | (A-1-5) | | | | | | |
| | | (A-1-6) | | | | | | |
| | | (A-1-7) | 100 | | 70 | | | |
| | | (A-1-8) | | 100 | | 50 | | |
| | (A-2) | (A-2-1) | | | 30 | | | 100 |
| | | (A-2-2) | | | | 50 | | |
| compound (B) having an ethylenically unsaturated group (parts by weight) | | (B-1) | 200 | | 200 | | | 200 |
| | | (B-2) | | 300 | | 500 | | |
| | | (B-3) | | | | | 300 | |
| photoinitiator (C) (parts by weight) | | (C-1) | 30 | | 10 | 30 | 10 | |
| | | (C-2) | 30 | 30 | 30 | 30 | 30 | 5 |
| | | (C-3) | | | 10 | | | 25 |
| | | (C-4) | | 20 | | 20 | | 10 |
| organic solvent (D) (parts by weight) | | (D-1) | 3000 | 5000 | 3000 | | | 4000 |
| | | (D-2) | | | | 5000 | 3000 | |
| pigment (E) (parts by weight) | | (E-1) | 200 | | | | 200 | |
| | | (E-2) | | 300 | | | | 300 |
| | | (E-3) | | | 300 | | | |
| | | (E-4) | | | | 500 | | |
| resin (F) (parts by weight) | | (F-1) | | | | | | |
| | | (F-2) | | | | | | |
| Evaluation results | | develop-resistance | X | X | X | X | ○ | X |
| | | heat-resistance | X | X | ○ | ○ | X | ○ |
| | | foreign matter | ○ | ○ | ○ | ○ | ○ | ○ |

Based on the above, in the invention, by using the alkali-soluble resin (A-1) containing the cyclicimide group-containing compound (a-2) and the alkali-soluble resin (A-2), the develop-resistance and heat-resistance of the photosensitive resin composition for color filters may be improved. As a result, the photosensitive resin composition for color filters having good develop-resistance may be obtained. Moreover, the photosensitive resin composition for color filters of the invention may further include the resin (F), which may help to reduce the size of foreign matter observed in the pixel color layer.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A photosensitive resin composition for a color filter, comprising:
   an alkali-soluble resin (A-1) formed by copolymerizing an ethylenically unsaturated monomer (a-1) having a carboxylic acid group, a compound (a-2) having a cyclicimide group represented by formula (1), and other copolymerizable ethylenically unsaturated monomers (a-3) except for the ethylenically unsaturated monomer (a-1) having a carboxylic acid group and the compound (a-2) having a cyclicimide group represented by formula (1),

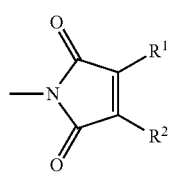

formula (1)

in formula (1), $R^1$ and $R^2$ are each independently selected from the group consisting of a hydrogen atom and an alkyl group of a carbon number of 1 to 10, but $R^1$ and $R^2$ are not both a hydrogen atom; or $R^1$ and $R^2$ both form a carbocyclic ring, wherein based on a total amount of 100 parts by weight of the ethylenically unsaturated monomer (a-1) having a carboxylic acid group, the compound (a-2) having a cyclicimide group represented by formula (1), and the other copolymerizable ethylenically unsaturated monomers (a-3), a content of the compound (a-2) having a cyclicimide group represented by formula (1) is between 20 parts by weight and 60 parts by weight;

an alkali-soluble resin (A-2) having a functional group represented by formula (2),

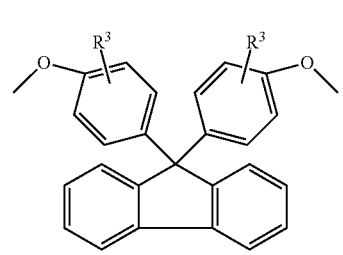

formula (2)

in formula (2), each $R^3$ is independently selected from the group consisting of a hydrogen atom, a straight chain or branch chain alkyl group of a carbon number of 1 to 5, a phenyl group, or a halogen atom;

a compound (B) having an ethylenically unsaturated group;

a photoinitiator (C);

an organic solvent (D); and a pigment (E).

2. The photosensitive resin composition of claim 1, wherein the compound (a-2) having a cyclicimide group represented by formula (1) is selected from the group consisting of compounds represented by formula (3), formula (4), and formula (5);

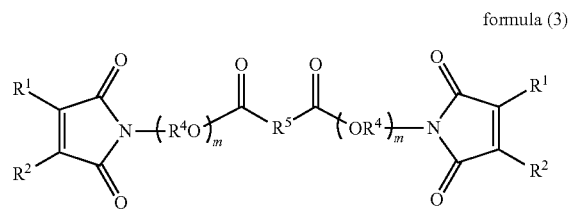

formula (3)

in formula (3), $R^1$ and $R^2$ are each independently selected from the group consisting of a hydrogen atom and an alkyl group of a carbon number of 1 to 10, but, $R^1$ and $R^2$ are not both a hydrogen atom; or $R^1$ and $R^2$ both form a carbocyclic ring; $R^4$ represents an alkylene group of a carbon number of 1 to 6; $R^5$ represents a residue obtained by removing a carboxylic acid group or an oxy dicarbonyl group from a polycarboxylic acid compound or an anhydride thereof; and m represents an integer of 1 to 6;

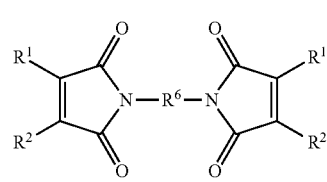

formula (4)

in formula (4), $R^6$ represents a residue obtained by removing an amino group from a diamine compound;

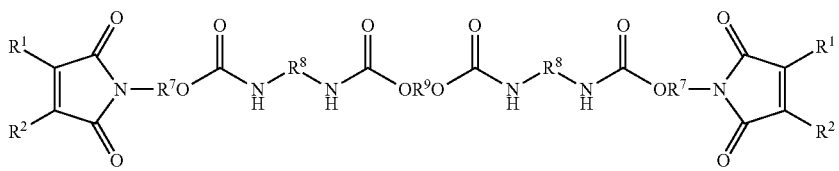

formula (5)

in formula (5), $R^7$ represents an alkylene group of a carbon number of 1 to 6; $R^8$ represents a residue obtained by removing an isocyanate group from a diisocyanate compound; and $R^9$ represents a residue obtained by removing a hydroxyl group from a diol compound.

3. The photosensitive resin composition of claim 1, wherein based on a total amount of 100 parts by weight of the alkali-soluble resin (A-1) and the alkali-soluble resin (A-2), a content of the alkali-soluble resin (A-1) is between 30 parts by weight and 90 parts by weight and a content of the alkali-soluble resin (A-2) is between 10 parts by weight and 70 parts by weight.

4. The photosensitive resin composition of claim 1, wherein based on a total amount of 100 parts by weight of the ethylenically unsaturated monomer (a-1) having a carboxylic acid group, the compound (a-2) having a cyclicimide group represented by formula (1), and the other copolymerizable ethylenically unsaturated monomers (a-3), a content of the ethylenically unsaturated monomer (a-1) having a carboxylic acid group is between 10 parts by weight and 40 parts by weight; a content of the other copolymerizable ethylenically unsaturated monomers (a-3) is between 0 parts by weight and 70 parts by weight.

5. The photosensitive resin composition of claim 1, wherein based on a total amount of 100 parts by weight of the alkali-soluble resin (A-1) and the alkali-soluble resin (A-2), a content of the compound (B) having an ethylenically unsaturated group is between 50 parts by weight and 500 parts by weight; a content of the photoinitiator (C) is between 10 parts by weight and 100 parts by weight; a content of the organic solvent (D) is between 1,000 parts by weight and 10,000 parts by weight; and a content of the pigment (E) is between 100 parts by weight and 1,000 parts by weight.

6. The photosensitive resin composition of claim 1, further comprising a resin (F).

7. The photosensitive resin composition of claim 6, wherein the resin (F) comprises a thermoplastic resin, a heat-curable resin, and a photo-curable resin.

8. The photosensitive resin composition of claim 6, wherein based on a total amount of 100 parts by weight of the alkali-soluble resin (A-1) and the alkali-soluble resin (A-2), a content of the resin (F) is between 30 parts by weight and 300 parts by weight.

9. A fabrication method of a color filter, using the photosensitive resin composition as claimed in claim 1 to form a pixel layer.

10. The fabrication method according to claim 9, wherein the compound (a-2) having a cyclicimide group represented by formula (1) is selected from the group consisting of compounds represented by formula (3), formula (4), and formula (5);

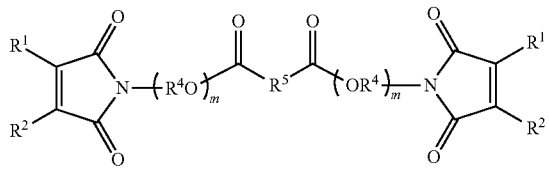

formula (3)

in formula (3), $R^1$ and $R^2$ are each independently selected from the group consisting of a hydrogen atom and an alkyl group of a carbon number of 1 to 10, but, $R^1$ and $R^2$ are not both a hydrogen atom; or $R^1$ and $R^2$ both form a carbocyclic ring; $R^4$ represents an alkylene group of a carbon number of 1 to 6; $R^5$ represents a residue obtained by removing a carboxylic acid group or an oxy dicarbonyl group from a polycarboxylic acid compound or an anhydride thereof; and m represents an integer of 1 to 6;

formula (4)

in formula (4), $R^6$ represents a residue obtained by removing an amino group from a diamine compound;

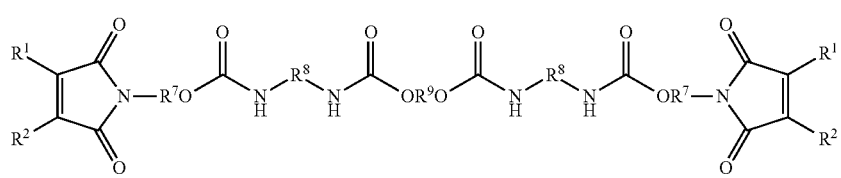

formula (5)

in formula (5), $R^7$ represents an alkylene group of a carbon number of 1 to 6; $R^8$ represents a residue obtained by removing an isocyanate group from a diisocyanate compound; and $R^9$ represents a residue obtained by removing a hydroxyl group from a diol compound.

11. The fabrication method according to claim 9, wherein based on a total amount of 100 parts by weight of the alkali-soluble resin (A-1) and the alkali-soluble resin (A-2), a content of the alkali-soluble resin (A-1) is between 30 parts by weight and 90 parts by weight and a content of the alkali-soluble resin (A-2) is between 10 parts by weight and 70 parts by weight.

12. The fabrication method according to claim 9, wherein based on a total amount of 100 parts by weight of the ethylenically unsaturated monomer (a-1) having a carboxylic acid group, the compound (a-2) having a cyclicimide group represented by formula (1), and the other copolymerizable ethylenically unsaturated monomers (a-3), a content of the ethylenically unsaturated monomer (a-1) having a carboxylic acid group is between 10 parts by weight and 40 parts by weight; a content of the compound (a-2) having a cyclicimide group represented by formula (1) is between 20 parts by weight and 60 parts by weight; a content of the other copolymerizable ethylenically unsaturated monomers (a-3) is between 0 parts by weight and 70 parts by weight.

13. The fabrication method according to claim 9, wherein based on a total amount of 100 parts by weight of the alkali-soluble resin (A-1) and the alkali-soluble resin (A-2), a content of the compound (B) having an ethylenically unsaturated group is between 50 parts by weight and 500 parts by weight; a content of the photoinitiator (C) is between 10 parts by weight and 100 parts by weight; a content of the organic solvent (D) is between 1,000 parts by weight and 10,000 parts by weight; and a content of the pigment (E) is between 100 parts by weight and 1,000 parts by weight.

14. The fabrication method according to claim 9, further comprising a resin (F).

15. The fabrication method according to claim 14, wherein the resin (F) comprises a thermoplastic resin, a heat-curable resin, and a photo-curable resin.

16. The fabrication method according to claim 14, wherein based on a total amount of 100 parts by weight of the alkali-soluble resin (A-1) and the alkali-soluble resin (A-2), a content of the resin (F) is between 30 parts by weight and 300 parts by weight.

17. A color filter, fabricated by the fabrication method of claim 9.

18. A liquid display, comprising the color filter of claim 17.

* * * * *